No. 871,239. PATENTED NOV. 19, 1907.
W. F. SCHNEIDER.
SYSTEM OF MOTOR CONTROL.
APPLICATION FILED NOV. 11, 1905.
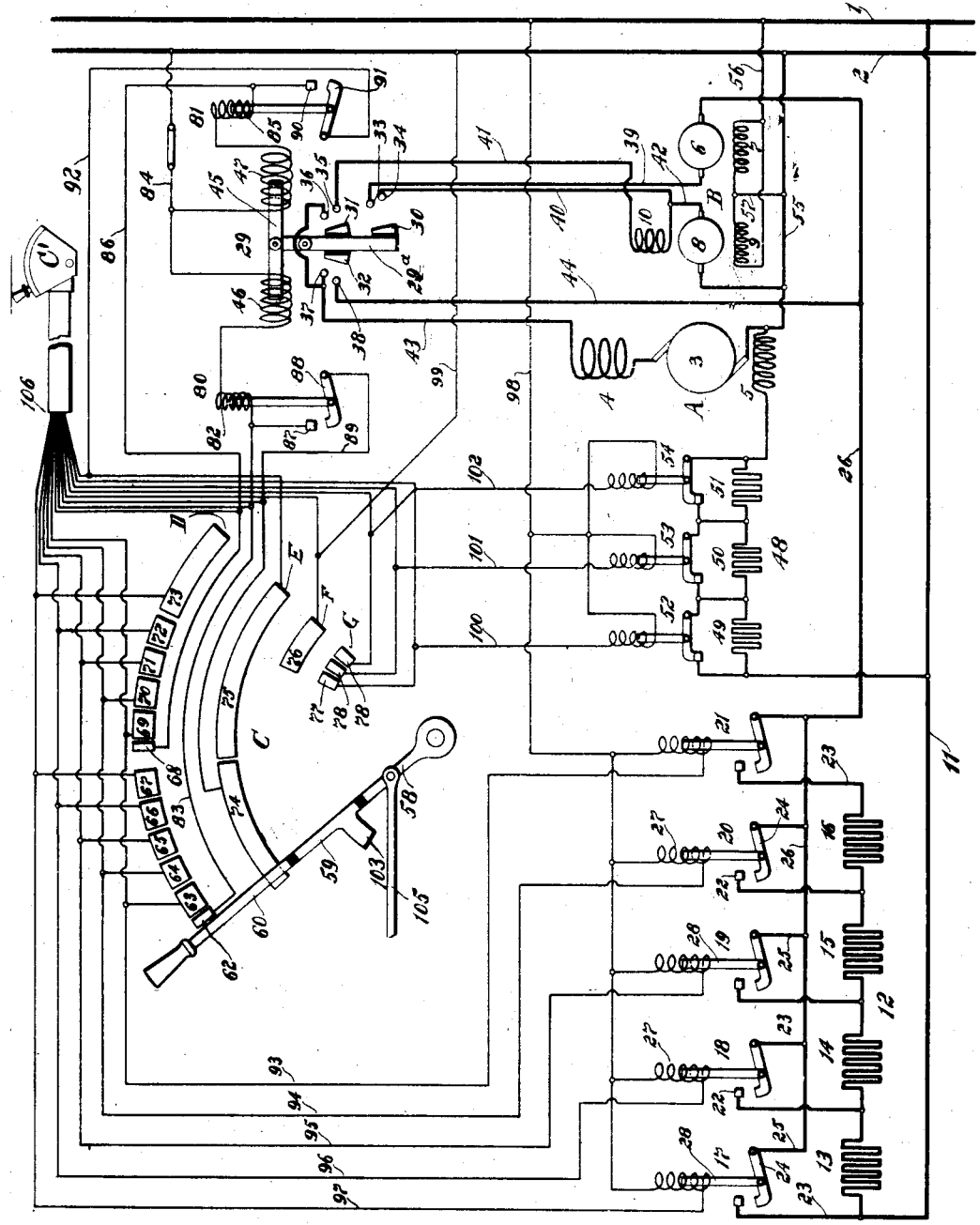
WITNESSES:
George J. Schwartz
Fred J. Kinsey.
INVENTOR:
William F. Schneider.
By
Chas. E. Lord
ATTORNEY.

UNITED STATES PATENT OFFICE.

WILLIAM F. SCHNEIDER, OF NORWOOD, OHIO, ASSIGNOR TO THE BULLOCK ELECTRIC MANUFACTURING COMPANY, A CORPORATION OF OHIO.

SYSTEM OF MOTOR CONTROL.

No. 871,239.

Specification of Letters Patent.

Patented Nov. 19, 1907.

Application filed November 11, 1905. Serial No. 286,961.

*To all whom it may concern:*

Be it known that I, WILLIAM F. SCHNEIDER, a citizen of the United States, residing at Norwood, in the county of Hamilton and State of Ohio, have invented certain new and useful Improvements in Systems of Motor Control, of which the following is a full, clear, and exact specification.

My invention relates to systems of motor control and especially to systems of control for motors which drive certain types of large machines, as printing presses.

The systems of control for motors which drive printing presses should be such that the press can be stopped and started evenly and without shock and can be driven at very low speeds. A system of control suitable for these purposes is illustrated in United States Patent to Burke No. 611,558, issued September 27th, 1898. In this system, the motor is driven at widely different speeds by varying the potential and the amounts of currents supplied to the motor. For the lower speeds of the motor, a teaser or motor-generator is employed. At an intermediate speed of the motor, the teaser or motor-generator is disconnected or cut out of circuit. After the teaser has been cut out, the current is entirely supplied from the main supply circuit.

In adjusting the cylinders of a printing press, it is necessary that the machine be driven very slowly and frequently stopped and started. It is therefore necessary that the operator have complete control of the machine at all times. If there is only a single controller handle located at a distance from the machine, considerable time and labor may be expended before the parts are in proper adjustment for the working speeds. Furthermore in case of accident or breakdown, a controller should always be within reach of the operator so that the machine can be instantly stopped.

The object of my invention is to provide means whereby a system of motor control, in which a motor-generator or teaser is employed for certain speeds, may be controlled at any remote distance or at a variety of positions about the driven machine, whereby the latter will be under more perfect control of the operator.

In carrying out my invention I provide electromagnetically operated means for controlling the motor-generator or converter, whereby the latter can be cut into or out of circuit from any desired position. In another aspect my invention consists in a system of motor control, a motor, a main source of current supply for the motor, an auxiliary source of supply for the same, a power operated controller for controlling the connections between said sources of supply and the motor, and means for controlling the operation of said controller from one or more distant points.

More specifically considered, my invention consists in a system of control for electric motors in which system a motor-generator is employed for the lowest speeds, means for connecting the main driving motor and motor of the motor-generator set to a supply circuit, a plurality of sections of resistance in circuit with the motor and motor-generator, a solenoid operated switch for controlling each of said sections of resistance, a solenoid operated switch for including in circuit or for cutting out of circuit the motor-generator, and a manually operated controller for operating all the switches.

My invention further consists in the arrangements of parts and electric circuits, and combination of elements, described in the specification and set forth in the appended claims.

For a better understanding of my invention, reference is had to the accompanying drawing which is a diagram of my invention. I have shown at 1, 2 the positive and negative conductors of the main source of current supply. The main driving motor is shown at A and consists of the armature 3, series field 4, and shunt field 5. At B, I have shown the teaser, converter or motor-generator set, consisting in this case of the motor armature 6, motor shunt field 7, generator armature 8, generator shunt field 9, and generator series field 10. The generator of this motor-generator set constitutes an auxiliary source of current supply for the main motor A.

Connected to the positive main 1 by conductor 11 is a variable resistance 12. This resistance is divided into sections 13, 14, 15, and 16 which are adapted to be short-circuited respectively by power-operated switches 17, 18, 19, and 20, in this case solenoid operated. A solenoid switch 21 is provided for closing the main circuit through the resistance, as will be explained later. The stationary contacts 22 of the switches are connected by conductors 23 to the sections of the resistance. The pivoted contact blades 24 are each connected by a conductor 25 to a conductor 26 which is adapted to be connected to the series field winding 4 and armature 3 of the main driving motor A either directly or through the motor armature 6 of the motor-generator set B, depending on the position of the controller handle. A solenoid coil 27 is provided for operating each of the switches 17 to 21. The cores of the solenoids consist of arms 28 attached to the blades 24. As will be explained later these solenoid cores are adapted to be energized successively by one or more master controllers located at any desired remote positions.

A double-throw solenoid operated switch 29 is adapted to control the connections of the driving motor A so that the latter may be supplied with current from the supply mains 1 and 2 or from the supply mains and the generator of the motor-generator set.

The switch 29 has a vertical pivoted arm 29$^a$ which carries three insulated contact blades 30, 31 and 32. These contact blades are adapted to engage respectively stationary contacts 33 and 34, 35 and 36, and 37 and 38. The negative brush of the motor armature 6 is connected by conductor 39 to contact 33. Contacts 34 and 35 are connected respectively by conductors 40 and 41 to the terminals of the series field winding 10 of the generator of the motor-generator set B, the conductor 40 being also connected by conductor 42 to the positive brush of the generator armature 8. Contacts 36 and 37 are connected to conductor 43 leading to the series field 4 and armature 3 of the main driving motor A. Contact 38 is connected by conductor 44 to conductor 26 leading from the resistance 12 as is shown. The arm 29$^a$ of the switch 29 carries at its upper end a horizontal arm 45, the ends of which form the cores of the solenoid coils 46 and 47. These solenoid coils are adapted to be energized respectively to throw the switch blades to the right and to the left. In series with the shunt field winding 5 of the motor A is the resistance 48 divided into sections 49, 50, and 51. These resistances are normally short circuited by solenoid operated switches 52, 53, and 54. These switches are adapted to be opened successively to cut into circuit resistances 49, 50, and 51 to weaken the shunt field 5 to increase the speed of the motor, as will be explained later. The negative brush of the main driving motor A is connected by conductor 55 to the negative supply main 2. The shunt field windings 7 and 9 of the motor generator-set are connected to the supply main 1 by conductor 56, and to conductor 55, which leads to supply main 2, by conductor 57. The solenoid operated switches 17, 18, 19, 20, 21, 29, 52, 53, 54, 80, and 81 control the various circuits and connections for obtaining the different speeds. These switches constitute the main, or power operated, controller. The power operated controller may be made in compact form and may be located in any desired position relative to the motor or driven machine.

A master-controller C, which may be located at any remote distance from the parts just described, consists of a pivoted handle divided into three insulated sections 58, 59, and 60 and four series of contacts D, E, F, G arranged in arcs of concentric circles. As is shown, the series D consists of contacts 62, 63, 64, 65, 66, 67, 68, 69, 70, 71, 72, and 73. Series E consists of two long contacts 74 and 75. Series F consists of single contact 76 and series G consists of three contacts 77, 78, and 79.

As is shown in the drawing, the solenoid operated switches 80 and 81 are located adjacent the solenoids 46, 47 of the switch 29. The solenoid coil 82 of the switch 80 is connected by conductor 83 to contact 62 at the left of the controller. The coil 82 is in series with the solenoid coil 46 which is connected by conductor 84 to the negative supply main 2. The solenoid coil 85 of switch 81 is connected to contact 68 by conductor 86 and is in series with the coil 47 which is connected to conductor 84 and to the supply main 2. The switch 80 has a stationary contact 87 connected to conductor 83 previously described, and a movable contact blade 88 connected by conductor 89 to contact 74 of series E. Switch 81 has a stationary contact 90 connected to conductor 86 and coil 85, and a movable contact blade 91 connected by conductor 92 to contact 75 of series E.

Contacts 63 and 69 are connected to solenoid coil of switch 21 by conductor 93. Contacts 64 and 70 are connected to the coil of switch 20 by conductor 94. Contact 65 and 71 are connected to the coil of switch 19, by conductor 95. Contact 66 and 72 are connected to coil of switch 18 by conductor 96. Contacts 67 and 73 are connected to coil 27 of switch 17 by conductor 97. All the solenoid coils are connected by conductor 98 to the positive supply main 1. As is evident from the drawing the contacts of the groups D and E are adapted to be bridged by the outer section 60 of the operating switch.

As is shown, the contact 76 is connected by conductor 99 to the negative supply main 2. The contacts 77, 78, and 79 are connected respectively by conductors 100, 101, 102 to the solenoid coils of the switches 52, 53, and 54 which control the variable resistance 48. As is shown, these switches are normally closed, but are opened when their respective solenoid coils are energized. The contact 76 and the contacts 77, 78, and 79 are adapted to be bridged by the middle section 59 of the controller handle. The section 59 of the handle is provided with a laterally extending lug 103, which engages the lug 77 and 78 when the switch is at its extreme right hand position in order that the coils of the switches 52 and 53 may continue to be energized and the switches 52 and 53 held in the open position after the controller handle has been thrown to this position The operation of the parts described will now be explained. When the printing press driving motor is at rest the master-controller handle will be at the extreme left hand position. In this position the switches 17 to 21, 29, 80, and 81 will be open. Now, if it is desired to start the machine slowly the controller handle is moved to the right until the section 60 engages the contacts 62, 63, and 74. It is seen that in this position of the controller handle, the circuit is completed through the solenoid coil of the switch 21 through the coil 82 of switch 80 and through the coil 46 of switch 29 as follows:—from supply main 1, conductor 98, solenoid of switch 21, conductor 93, contact 63, contact 62, conductor 83, solenoid coil 82, solenoid coil 46, conductor 84 to negative supply main 2. The solenoid cores and hence the contact blades of the switches 21 and 80 will be raised and these switches will be closed; the horizontal arm 45 of switch 29 will be thrown to the left and contact blades 30 and 31 will bridge the contacts 33 and 34, and 35 and 36. The motor will now be driven at its slowest speed and the main driving circuit is as follows:—from main 1, conductor 11, sections 13, 14, 15, and 16 of resistance 12, switch 21, conductor 26, armature 6 of the motor-generator set, conductor 39, contact blade 30, conductor 40, series field 10 of the generator of the motor-generator set, conductor 41, contact blade 31, conductor 43, field 4 of the driving motor A, armature 3 of the motor, conductor 55 to negative supply main 2. Generator 8 also supplies current to the motor A and the circuit of the generator is as follows: positive brush of the armature of generator 8, conductor 42, field 10, conductor 41, contact blade 31, conductor 43, series field 4 and armature 3 of driving motor A to the negative brush of the armature 8. It is seen that the motor armature 6 is in series with the main driving motor A, both of which are supplied with current from supply mains 1, 2. The armature 8 of the generator, which may be mounted on the same shaft as the armature 6 of the motor, likewise supplies low potential current to the driving motor. The current of the driving motor A is of high amperage and low voltage for producing the slowest speed required and at the same time for providing a strong starting torque. To increase the speed of the driving motor and of the machine, the master-controller handle is moved to the right. As the controller handle moves from the contact 62 the circuits above traced will remain completed because the switch 80 is now closed.

It will be seen that the switch 80 will be maintained closed until section 60 of the controller handle is moved beyond the contact 67, when the circuit through the coils 82 and 46 will be interrupted and the switches 80 and 29 will be opened. As the controller handle moves from contact 63 to contact 64, the solenoid coil of switch 20 will be energized and the latter switch will be closed, short-circuiting the section 16 of the resistance 12. The armatures 6 and 8 of the motor-generator set will now be driven at a higher speed, and current of higher potential will be supplied to the driving motor A which results in increased speed. In the similar manner as the controller handle is moved successively from contact 64 to contact 67 the resistances 15, 14, and 13 will be successively short-circuited and the speed increased step by step.

When the controller handle engages the contact 67, the motor is driven at the highest speed which can be obtained with the motor-generator set in circuit. As the controller handle is moved ahead from contact 67, the circuit to the coil of the solenoid switch 17 and through the solenoid coils 82 and 46 are broken. As the handle is moved still further to the right until it bridges the contacts 68 and 69 the circuit through the switch operating conductors will again be completed. The connections are then as follows:—from supply main 1, conductor 98, solenoid coil of switch 21, conductor 93, contact 69, contact 68, conductor 86, coil 85 of switch 81, coil 47, conductor 84 to supply main 2. Switches 21 and 81 will now be closed and switch arm 29ª will be thrown to the left, contact blade 32 bridging the contacts 37 and 38. The closing of the switch 81 allows the controller arm to be moved ahead from contact 68 without interrupting the circuit just traced. It is seen that when the controller handle is on contact 69 the main circuit through the motor is as follows: from supply main 1, conductor 11, all the resistance sections 13, 14, 15, and 16, switch 21, conductor 26, conductor 44, contact blade 32, conductor 43, series field 4 and armature 3 of main driving motor A, conductor 55 to supply main 2. It is seen that the motor-generator set is now out of circuit and that the current is supplied directly to the armature of the motor through the resistance sections 13, 14, 15, and 16. By moving the controller handle from contact 69 to 73 successively further increases in speed are obtained, the solenoid switches connected to the contacts 69 to 73 respectively, being successively closed and resistance sections 16, 15, 14, and 13 being successively short-circuited.

So far, the switches 52, 53, 54 have been closed and the resistance sections 49, 50, and 51 have all been short-circuited, or out of the shunt field circuit 5 of the motor A. To still further increase the speed of the motor, the controller handle is moved further to the right until the contacts 76 and 77 are bridged by the section 59 of the handle. The auxiliary or switch controlling circuit is now completed as follows:—from main 1, conductor 98, solenoid coil of switch 52, conductor 100, contact 77, section 59 of the controller handle, contact 76, conductor 99, supply main 2. Switch 52 will now be opened and the section 49 of the resistance 48 will be inserted in series with the shunt field winding 5. The field magnetization will therefore be decreased and the speed of the motor will be increased. It will be noted that contacts 73 and 75 are still bridged by the section 60 of the controller handle, thus the circuit through the solenoid coil of switch 17 will remain completed and this switch will remain closed for further movement of the handle to the right. The switch 81 and switch 29 will be maintained in their closed position as long as the contacts 73 and 75 are bridged by the section of the controller handle. On moving the controller handle still further to the right switches 53 and 54 will be opened in succession and resistance sections 50 and 51 will be inserted, together with the resistance 49, in series with the shunt field 5, thus still further increasing the speed of the driving motor. When the switch is at its extreme right hand position, with the section 59 of the handle bridging contacts 76 and 79, lug 103 on the section 59 maintains the circuit through the coils of the switches 52 and 53 closed. Thus all the switches 52, 53 and 54 will be held open. The motor A is now driven at its highest speed.

If it is desired to stop the motor, the controller handle can be moved either to contact 68 or to contact 62. If the slow speeds at starting are not desired the operator will stop the motor with the controller handle on contact 68 and then by movements of the handle to the right running speeds can be quickly obtained without subjecting the motor to the very low speeds obtained with the motor-generator set. If however, the operator desires the low speeds, the machine will be stopped with the controller handle at the extreme left, then if he desires to start the machine or to drive it slowly for making necessary adjustments of any of the parts of the machine as for adjusting the cylinders of the printing press, the controller handle will be moved slowly to the right when the motor-generator set will be in circuit.

All the switch controlling conductors connected to the supply mains and to the contacts of the master-controller can be of comparatively small size and hence said master-controller can be located at any distance remote from the main controller and other operating parts of the system and can therefore be located in the most convenient place. Not very heavy currents are required to operate the different switches of the main controller and therefore the master-controller and its contacts can be made small. This is an important feature for the reason that the master controller can then be operated by auxiliary levers or master controlling handles located at a variety of places about the driven machine. These auxiliary controlling handles can be connected to the master-controlling handle by means of any suitable system of rods and levers, one rod of said system being illustrated at 105. The conductors connected with the contacts of the master-controller may if desired be extended as indicated at 106 to connect with corresponding contacts of one or more separate and distinct master-controllers C' similar to that shown at C. I may operate the power operated controller from a variety of positions not only by a number of auxiliary controller handles connected to the handle of the master controller C by a system of links and levers as described, or by one or more electrically connected master controllers, but if desired I may employ both systems. For example, I may employ two or more electrically connected master controllers to the operating handle of each of which may be connected by links and levers one or more of the auxiliary handles.

I do not wish to be confined to the details shown or the exact arrangements of switches and circuits. I aim in my claims to cover all modifications which do not depart from the spirit and scope of my invention.

What I claim as new and desire to secure by Letters Patent is—

1. In combination, an electric motor, a supply circuit, means for connecting the motor with the supply circuit, a converter in circuit with the motor and with the supply circuit to assist in supplying said motor, and electro-magnetically operated means for breaking the converter circuit.

2. In combination, an electric motor, a supply circuit, means for connecting the motor with the supply circuit, a converter in circuit with the motor and with the supply circuit, a solenoid operated switch for connecting the converter to, and disconnecting the converter from, the motor and the supply circuit, and means for controlling said switch.

3. In combination, an electric motor, a supply circuit, a converter, electro-magnetically operated means for connecting the converter with the supply circuit and with the motor and for disconnecting it from both, a rheostat in the converter circuit, and electromagnetically operated means for controlling said rheostat.

4. In combination, an electric motor, a supply circuit, means for connecting the motor with the supply circuit, a converter in circuit with the motor and with the supply circuit, a rheostat in the supply circuit, electromagnetically operated means for controlling said rheostat, and electro-magnetically operated means for breaking the converter circuit at an intermediate speed of the motor.

5. In combination, an electric motor, a supply circuit, means for connecting the motor with the supply circuit, a variable resistance in the supply circuit, a converter in circuit with the motor and with said supply circuit, solenoid operated switches for controlling the variable resistance, a solenoid operated switch for breaking the converter circuit at an intermediate speed of the motor, and means for controlling said switches.

6. In a system of control, a supply circuit, a motor connected with said supply circuit, a motor-generator set connected with said supply circuit and with said motor, a plurality of resistance sections in circuit with said motor and motor-generator set, a solenoid for controlling each of said resistance sections, a solenoid operated switch for making or breaking the connection between the motor-generator set and the source of supply and the motor, and means for controlling all said solenoid switches.

7. In combination, an electric motor, a supply circuit, means for connecting the motor with the supply circuit, a converter in circuit with the motor and the supply circuit, electro-magnetically operated means for varying the strength of the current in the converter circuit and electro-magnetically operated means for disconnecting the converter at an intermediate speed of the motor.

8. In combination, an electric motor, a supply circuit, means for connecting the motor with the supply circuit, a converter having its primary connected with said supply circuit and its secondary to said motor, electro-magnetically operated means for controlling the current supplied to said motor and to the primary of said converter, electro-magnetically operated means for breaking the converter circuit at an intermediate speed of the motor, and means for controlling all said electro-magnetically operating means.

9. In a system of control for electric motors, a supply circuit, a motor-generator set, means for connecting the supply circuit to the motor of the motor-generator set and to the main motor, means for connecting the generator of the motor-generator set to the main motor, a plurality of sections of resistance in circuit with the motor and motor-generator set, a solenoid operated switch for controlling each of said sections of resistance, a solenoid operated switch for controlling the motor-generator circuit, and a manually operated controller for operating all said switches.

10. In a system of control, a supply circuit, a motor, means for connecting said motor to the supply circuit, a converter, means for connecting said converter to its supply circuit and to the motor, a plurality of sections of resistance in circuit with the converter and motor, electro-magnetically operated means for controlling step by step said sections of resistance, electro-magnetically operated means for breaking the converter circuit at an intermediate speed of the motor and for connecting the motor through the resistance sections to the supply circuit, and means for controlling said electro-magnetically operated means.

11. In a system of control, a supply circuit, a motor having a shunt field, a variable resistance in said shunt field circuit, means for connecting the motor to the supply circuit, a converter, means for connecting said converter to the supply circuit and to said motor, a variable resistance in said converter circuit, electro-magnetically operated means for controlling step by step the resistance in the converter circuit, electro-magnetically operated means for making or breaking the converter circuit, electro-magnetically operated means for controlling step by step the resistance in said shunt field circuit of the motor, and manually operated means for controlling all the different electro-magnetically operated means.

12. In a system of control, a supply circuit, a motor having a shunt field, in series with which is a variable resistance, a converter having its primary connected to said supply circuit and to said motor and having its secondary connected to said motor, a variable resistance in series with the primary of the converter and the motor, a plurality of solenoid operated switches for controlling said resistance step by step, a solenoid operated switch for breaking the converter circuit at an intermediate speed of the motor, a plurality of solenoid operated switches for controlling step by step the resistance in the shunt field circuit of the motor, and a controller for all said switches.

13. In a system of motor control, a motor, a main source of current supply for said motor, an auxiliary source of supply for the same, a power operated controller for connecting said two sources of supply to the motor simultaneously and for disconnecting the auxiliary source of supply, and means for controlling the operation of said controller from a distant point.

14. In a system of motor control, a motor, a main source of current supply for said motor, an auxiliary source of supply for the same, a power operated controller for controlling the connections between said sources of supply and the motor, and a plurality of master controllers for the operating means of said power operated controller.

15. In a system of motor control, a motor, a main source of current supply for said motor, a generator as an additional source of current supply therefor, a power operated controller for connecting said motor to said two sources in parallel or to only one of said sources, and means for controlling said power operated controller from a distant point.

16. In a system of motor control, a motor, a main source of current supply and an auxiliary source of current supply for said motor, a power operated switch for connecting said sources of supply in different relations to said motor, and means for controlling said power operated switch from a plurality of distant points.

17. In a system of motor control, a motor, a main source of current supply for said motor, a converter as an additional source of current supply therefor, power operated means for connecting said motor to be supplied from said two sources in parallel or from one only of said sources, and means for controlling said power operated means from a distant point.

18. In a system of motor control, a motor, a main source of current supply, and a converter as an additional source of current supply for said motor, a power operated controller for connecting said sources of supply in different relations to said motor, and a plurality of master controllers for governing said power operated controller.

19. In a system of motor control, a motor, a main source of current supply for said motor, a motor-generator adapted to be connected to said source of supply and to said motor, a power operated controller for connecting said main source of supply and motor-generator to said motor, either singly or in parallel, and means for controlling said power operated controller from one or more distant points.

20. In a system of motor control, a motor, a main source of current supply for said motor, an auxiliary source of current supply therefor, an electro-magnetically operated switch for controlling the connections between the sources of supply and the motor, and means for controlling said electro-magnetically operated switch from a plurality of distant points.

21. In a system of motor control, a motor, a main source of current supply for said motor, a motor-generator adapted to be connected to the source of supply and to said motor, electro-magnetically operated means for controlling the connections between the main source of supply, the motor-generator, and the motor, and a plurality of master-controllers for governing said electro-magnetically operated means.

22. In a system of motor control, a motor, a main source of current supply for said motor, and an auxiliary source of supply therefor comprising a motor-generator, electro-magnetically operated switches for controlling the connections between the sources of supply and the motor, and a plurality of master-controllers for said switches.

23. In a system of motor control, a motor, a main source of current supply for said motor, and a motor-generator as an additional source of current supply therefor, an adjustable rheostat, electro-magnetically operated means for connecting said motor and adjustable rheostat in various relations to said sources of current supply, and a plurality of master-controllers for said switches.

24. In a system of motor control, a motor, a source of current supply, means for connecting the motor with said source of supply, a converter in circuit with the motor and with the source of supply to assist in supplying said motor, electro-magnetically operated means for breaking the converter circuit, and means for controlling said electro-magnetically operated means from one or more distant points.

25. In a system of motor control, a motor, a supply circuit, means for connecting the motor with supply circuit, a converter in circuit with the motor and with the source of supply, an electro-magnetically operated switch for connecting the converter to, and disconnecting the converter from, the motor and the supply circuit, and means for controlling said switch from one or more distant points.

26. In a system of motor control, a motor, a supply circuit, a converter, electro-magnetically operated means for connecting the converter with the supply circuit and with the motor and for disconnecting it from both, a rheostat in the converter circuit, electro-magnetically operated switches for controlling said rheostat, and one or more master controllers for operating said switches.

27. In a system of motor control, a motor, a supply circuit, means for connecting the motor with the supply circuit, a converter in circuit with the motor and supply circuit, an adjustable rheostat in the supply circuit, electro-magnetically operated means for controlling the rheostat and for breaking the converter circuit at an intermediate speed of the motor, and one or more master controllers for operating said means.

28. In a system of motor control, a supply circuit, a motor connected to said supply circuit, a converter in circuit with the motor and the supply circuit, electro-magnetically operated means for varying the strength of the current in the converter circuit, electromagnetically operated means for cutting the converter out of circuit at an intermediate speed of the motor, and one or more master controllers for operating said means from one or more distant points.

29. In a system of motor control, a motor, two sources of current supply, and remotely controlled means for connecting said motor to the two sources of supply in parallel or to one of said sources alone.

30. In a system of motor control, a motor, two sources of current supply, means for connecting said motor to the two sources of supply in parallel or to one of said sources alone, and means for governing said first mentioned means from a plurality of points.

31. In a system of motor control, a motor, two sources of current supply, and electromagnetically operated means for connecting said motor to the two sources of supply in parallel or to one of said sources alone.

32. In a system of motor control, a motor, two sources of current supply, electromagnetically operated means for connecting said motor to the two sources of supply in parallel or to one of said sources alone, and remote means for governing said electromagnetically operated means.

33. In a system of motor control, a motor, a main source of current supply, a motor-generator set, and electro-magnetically operated means for connecting the generator of said motor-generator set in parallel with the main source of supply to supply the motor, and for disconnecting said generator.

34. In a system of motor control, a motor, a main source of current supply, a motor-generator set, remotely controlled means for connecting the generator of said motor-generator set in parallel with the main source of supply to supply the motor, and for disconnecting the motor generator set.

35. In a system of motor control, a motor, two sources of current supply, and remotely controlled means for connecting said motor to be supplied by said two sources jointly or by one of said sources alone.

36. In a system of motor control, a motor, two sources of current supply, means for connecting said motor to be supplied from said two sources jointly or from one of said sources alone, and means for governing said controlling means from a plurality of points.

37. In a system of motor control, a motor, two sources of current supply, and electrically operated means for connecting said motor to be supplied by said two sources of current jointly or by one of said sources alone.

38. In a system of motor control, a motor, two sources of current supply, electrically operated means for connecting said motor to be supplied by said two sources of current jointly or by one of said sources alone, and means for governing said controlling means.

39. In a system of motor control, a motor, two sources of current supply, electrically operated means for connecting said motor to be supplied by said two sources of current jointly or by one of said sources alone, and means for governing said controlling means from a plurality of points.

In testimony whereof I affix my signature, in the presence of two witnesses.

WILLIAM F. SCHNEIDER.

Witnesses:
ARTHUR F. KWIS,
FRED J. KINSEY.